(No Model.)
G. M. REED.
PLACER MACHINE.
No. 453,278. Patented June 2, 1891.
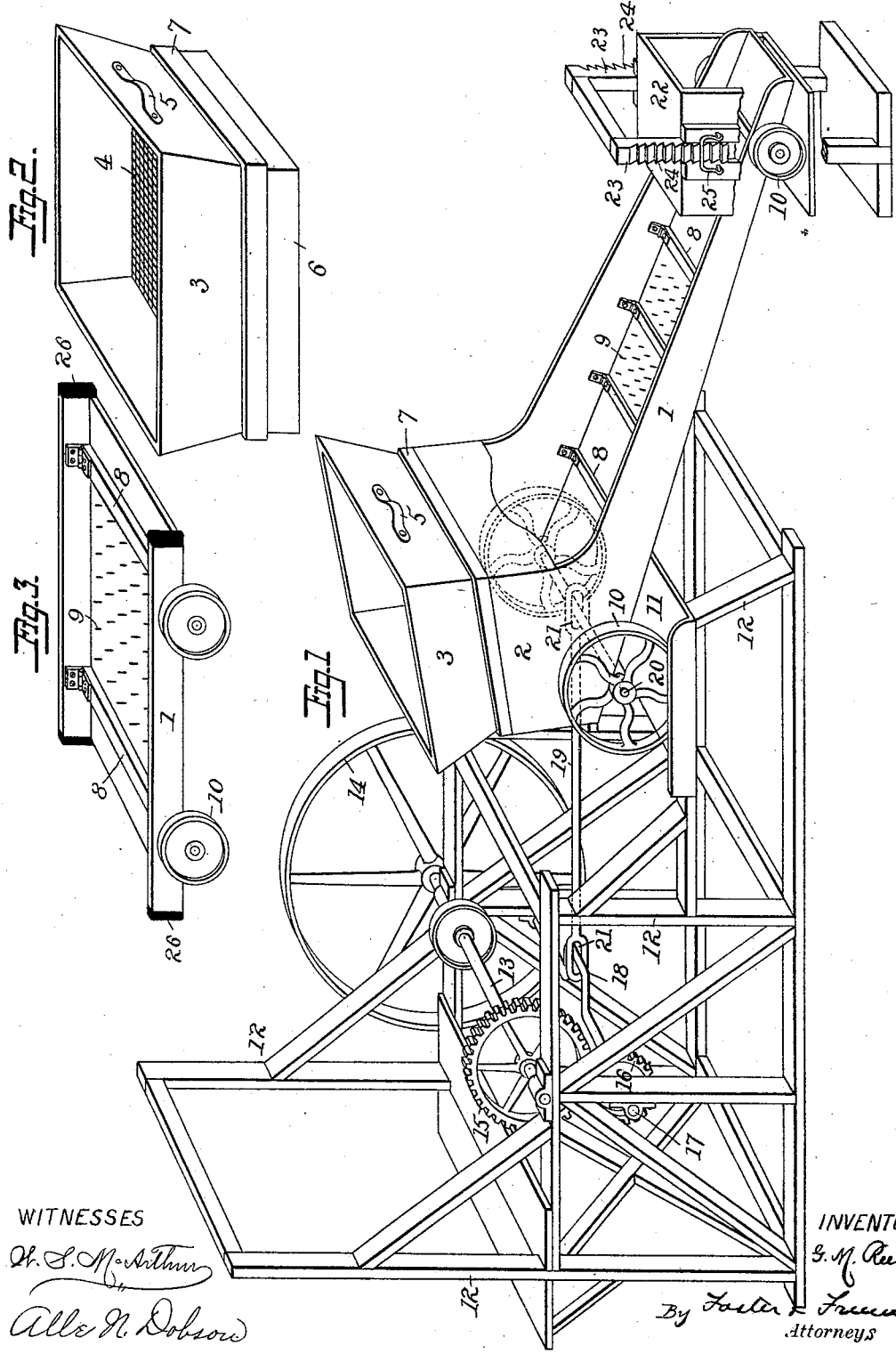
WITNESSES
H. S. McArthur
Alle N. Dobson
INVENTOR
G. M. Reed
By Foster & Freeman
Attorneys

UNITED STATES PATENT OFFICE.

GEORGE MELVILLE REED, OF BOSTON, ASSIGNOR OF ONE-FOURTH TO DANIEL H. BISHOP, OF WEST MEDFORD, MASSACHUSETTS.

PLACER-MACHINE.

SPECIFICATION forming part of Letters Patent No. 453,278, dated June 2, 1891.

Application filed July 22, 1890. Serial No. 359,504. (No model.)

*To all whom it may concern:*

Be it known that I, GEORGE MELVILLE REED, a citizen of the United States, residing at Boston, in the county of Suffolk and State of Massachusetts, have invented certain new and useful Improvements in Placer-Machines, of which the following is a specification.

My invention relates more particularly to the dry separation of gold from masses of dirt, sand, powdered quartz, or ore, &c., and while it is particularly adapted for this purpose it may of course be used for other purposes and in other processes.

The object of my invention is to produce a simple, cheap, and effective machine which shall operate more perfectly, quickly, and effectively to separate the precious metals without loss from the various impurities usually associated therewith.

To this end my invention consists in a machine constructed, arranged, and operated substantially as hereinafter more particularly set forth.

Referring to the accompanying drawings, Figure 1 is a perspective view showing one (and the preferred) embodiment of my invention. Fig. 2 is a similar view of the hopper and sieve detached, and Fig. 3 is a perspective view of a modified form embracing some features of my invention.

The pan, box, or sluiceway 1 consists, as shown in Fig. 1, of an open trough having a rectangular mouth 2, into which is detachably fitted a hopper 3, having a sieve or screen 4 at the bottom thereof. While this hopper may be of any desired shape and construction, I preferably form it as indicated in Fig. 2, in which the sides are made flanged at the top and are provided with handles 5, and the bottom is made with a neck or extension 6, adapted to fit in the mouth 2 of the pan or box, and a flange 7 supports it therein. The pan or box is preferably made tapering toward its end, as shown in Fig. 1, and is provided at suitable intervals with a number of riffle-boards 8, which are hinged to one of the sides and normally extend across the pan at suitable intervals. Between the riffles I prefer in some instances to arrange a series of projections 9, which may be in the form of nails or rods secured to the bottom of the pan, and which serve to aid in stirring or mixing the materials therein. This pan is mounted upon wheels or runners 10, there being four shown in the drawings, two being arranged near each end of the pan. The inner pair of these wheels is mounted upon a suitable platform 11 of a frame-work 12, which may be of any suitable construction and adapted to support the driving-gear to agitate or move the pan.

In the drawings I have shown the shaft 13 as being provided with a suitable driving-wheel 14 and carrying a large gear-wheel 15, engaging a smaller gear 16, attached to the shaft 17. This shaft is provided with a crank 18, to which is connected the pitman 19, the other end of the pitman being connected to the pan in any suitable way and, as shown, to the axle 20 of the wheels 10. This pitman is provided with an elongated slot 21 at one or both ends, where it engages with the axle and crank. The other end of the pan or box is supported on a platform 22, which is arranged to be adjusted in the standards 23, so that the inclination of the pan or box can be regulated as desired. Any suitable means may be provided for maintaining the platform 22 in its adjusted position, and I have shown the standards 23 as provided with a series of notches 24, in which a loop or catch 25, attached to the platform, engages.

In Fig. 3 I have shown the pan 1 as mounted upon the wheels 10 and provided with the hinged riffle-boards 8 at each end, and I also provide the ends of the pan with elastic cushions 26, of rubber or other suitable material.

Such being the construction of my device, its operation will be understood, and is as follows: The material to be separated is placed in the hopper 3 and passes through the screen 4 onto the bottom of the pan. The driving mechanism being operated, it will be seen that a reciprocating motion is given to the pan through the medium of the pitman, and as the pitman is connected at one or both ends by an elongated slot or bearing it will be seen that such reciprocation is preceded by a sort of shock or percussive blow, which disturbs the material, tending to throw the lighter parts to the top and forward, while the heavier and precious metals settle to the bottom and are caught by the riffles. I have found that this percussive action is a very important aid in separating the metals, as it causes the lighter materials to rise to the top and finally to be thrown out of the pan, while all of the heavier metals are retained by the riffles. When this operation has continued a sufficient time, the riffles can be swung out of position and the precious metals gathered by washing or otherwise and the operation resumed. This jolting or percussive motion also aids in sifting the materials through the sieve. In the device shown in Fig. 3 substantially the same operation is carried out, except that the pan or box is moved by hand and caused to impinge or bump against some stationary object, and this causes the lighter materials to be thrown or precipitated over the riffles, while the heavier are retained in the box.

Having thus described my invention, without limiting myself to the precise construction, forms, and arrangements shown, I claim—

1. In a placer-machine, the reciprocating pan having an inclined bottom provided with hinged riffle-boards and projecting pins intermediate said riffle-boards, substantially as described.

2. The combination, in a placer-machine, of a pan provided with wheels at each end, a separate supporting-platform at each end for the wheels, one of said platforms being vertically adjustable to vary the inclination of the pan, a rotatable shaft provided with a crank, and a connection between the crank and the pan provided with an elongated slot, substantially as described.

In testimony whereof I have signed my name to this specification in the presence of two subscribing witnesses.

GEO. MELVILLE REED.

Witnesses:
J. S. BARKER,
W. S. McARTHUR.